United States Patent
Liu

(10) Patent No.: US 10,924,312 B1
(45) Date of Patent: Feb. 16, 2021

(54) SYSTEM AND METHOD OF DEMODULATING FREQUENCY SHIFT KEYING SIGNAL

(71) Applicant: ANPEC ELECTRONICS CORPORATION, Hsinchu (TW)

(72) Inventor: Yun-Li Liu, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/865,534

(22) Filed: May 4, 2020

(30) Foreign Application Priority Data

Feb. 17, 2020 (TW) ............... 109104930 A

(51) Int. Cl.
*H04L 27/156* (2006.01)

(52) U.S. Cl.
CPC ................... *H04L 27/156* (2013.01)

(58) Field of Classification Search
CPC ....... H04L 27/10; H04L 27/14; H04L 27/156; H04L 27/1563
See application file for complete search history.

(56) References Cited

U.S. PATENT DOCUMENTS

| | | | |
|---|---|---|---|
| 7,898,322 B1* | 3/2011 | Lemkin | H04L 27/2332 329/302 |
| 9,225,568 B1* | 12/2015 | Mei | H04L 27/1563 |
| 2018/0131544 A1* | 5/2018 | Dicola | H04L 27/1563 |

* cited by examiner

*Primary Examiner* — David B Lugo
(74) *Attorney, Agent, or Firm* — Li & Cai Intellectual Property (USA) Office

(57) ABSTRACT

A system and a method of demodulating a frequency shift keying signal are provided. The method includes steps of: inputting the frequency shift keying signal; accumulating cycles of the frequency shift keying signal to a reference cycle number from a time point; finding an initial point of each of pulse waves of the frequency shift keying signal; accumulating the cycles to the reference cycle number multiple times from the initial point and extracting data of each accumulation; determining whether or not the number of times of extracting the data reaches a preset value, if not, returning to the previous step, if yes, performing the next step; determining whether or not a difference between the data is larger than a threshold, if not, outputting a first bit value, if yes, outputting a second bit value; and packing the first and second bit values into a demodulated signal.

4 Claims, 6 Drawing Sheets

SYSTEM AND METHOD OF DEMODULATING FREQUENCY SHIFT KEYING SIGNAL

CROSS-REFERENCE TO RELATED PATENT APPLICATION

This application claims the benefit of priority to Taiwan Patent Application No. 109104930, filed on Feb. 17, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a demodulating system and method, and more particularly to a system and a method of demodulating a frequency shift keying signal.

BACKGROUND OF THE DISCLOSURE

Before a wireless communication system transmits a signal carrying data, the data needs to be modulated. A frequency shift key (FSK) modulating method is one kind of frequency modulating method that is often used for modulation of the data. A frequency of a frequency shift keying signal changes very slightly and quickly. Therefore, a high-order microcontroller having a good computing capability is required for a demodulation of the frequency shift keying signal. The high-order microcontroller timely captures the data of pulse waves of the frequency shift keying signal each time one pulse wave is generated. The high-order microcontroller instantly determines change of the frequency of the frequency shift keying signal for demodulation, according to a difference between the data extracted over multiple times.

SUMMARY OF THE DISCLOSURE

In response to the above-referenced technical inadequacies, the present disclosure provides a method of demodulating a frequency shift keying signal. The method includes the following steps: inputting the frequency shift keying signal; dividing the number of complete cycles of the frequency shift keying signal that is required for one bit by a preset value to obtain a reference cycle number; accumulating cycles of the frequency shift keying signal to the reference cycle number from a time point; determining whether or not an initial point of each of pulse waves of the frequency shift keying signal is found, in response to determining that the initial point is not found, returning to previous step (c), in response to determining that the initial point is found, performing next step (e); accumulating the cycles of the frequency shift keying signal to the reference cycle number multiple times from the initial point of each pulse wave of the frequency shift keying signal, and extracting data of the pulse wave from a starting point to an ending point of each accumulation; determining whether or not the number of times of extracting the data reaches the preset value, in response to determining that the number of times of extracting the data fails to reach the preset value, returning to previous step (e), in response to determining that the number of times of extracting the data reaches the preset value, performing next step (g); calculating a difference between the data extracted multiple times; determining whether or not the difference between the data is larger than a threshold, in response to determining that the difference is not larger than the threshold, outputting a first bit value, in response to determining that the difference is larger than the threshold, outputting a second bit value, wherein the second bit value is not equal to the first bit value; and packing the first bit value and the second bit value into a demodulated signal.

In certain embodiments, the method further includes the following step: setting the preset value to 4.

In certain embodiments, the method further includes the following steps: calculating the complete cycle of each of carrier waves of the frequency shift keying signal that is not modulated; and subtracting a non-modulated cycle from the complete cycle of the carrier waves of the frequency shift keying signal to obtain a non-demodulated signal.

In certain embodiments, the method further includes the following step: generating the threshold according to waveform parameters of the non-demodulated signal.

In addition, the present disclosure provides a system of demodulating a frequency shift keying signal. The system includes a complete cycle calculator, a cycle accumulator, a pulse data extractor and a demodulator. The complete cycle calculator is configured to receive the frequency shift keying signal and calculate the number of complete cycles of the frequency shift keying signal that is required for one bit. The cycle accumulator is connected to the complete cycle calculator. The cycle accumulator is configured to divide the number of the complete cycles that is required for one bit by a preset value to obtain a reference cycle number, and accumulate cycles of the frequency shift keying signal to the reference cycle number multiple times from a time point. The pulse data extractor is connected to the cycle accumulator. The pulse data extractor is configured to extract data of each pulse wave from a starting point to an ending point of each accumulation performed by the cycle accumulator, until the number of times of extracting the data reaches the preset value. The demodulator is connected to the pulse data extractor. The demodulator is configured to calculate a difference between the data extracted by the pulse data extractor. When the difference is smaller than a threshold, the demodulator outputs a first bit value. When the difference is larger than the threshold, the demodulator outputs a second bit value that is not equal to the first bit value. The demodulator is configured to package the first bit value and the second bit value into a demodulated signal.

In certain embodiments, the preset value is 4.

In certain embodiments, the system further includes a non-modulated cycle detector, which is configured to receive the frequency shift keying signal and detect a non-modulated cycle of the frequency shift keying signal.

In certain embodiments, the system further includes a non-demodulated signal generator. The non-demodulated signal generator is connected to the complete cycle calculator and the non-modulated cycle detector. The non-demodulated signal generator is configured to subtract the non-modulated cycle from the complete cycle of each of carrier waves of the frequency shift keying signal that is not modulated to obtain a non-demodulated signal.

In certain embodiments, the cycle accumulator is configured to subtract the non-modulated cycle from the complete cycle form the complete cycle to obtain a modulated cycle. The cycle accumulator is configured to divide the number of the modulated cycles required for one bit by the preset value to obtain the reference cycle number.

In certain embodiments, the demodulator is configured to generate the threshold according to waveform parameters of the non-demodulated signal.

As described above, the present disclosure discloses the system and method of demodulating the frequency shift keying signal. The threshold is calculated based on the parameters of the pulse waves of the frequency shift keying signal, the cycle of which does not include the non-modulated cycle. The threshold is a constant value, which does not change with the frequency of the frequency shift keying signal. It is worth noting that, the data of the frequency shift keying signal is not processed until the number of the cycles of the frequency shift keying signal reaches N (such as 128). Therefore, the demodulation of the frequency shift keying signal can be completed in simple steps such that a computational complexity of the system can be greatly reduced. As a result, the frequency shift keying signal can be demodulated by using low-order circuit components of the system under the condition that the system operates in a low frequency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
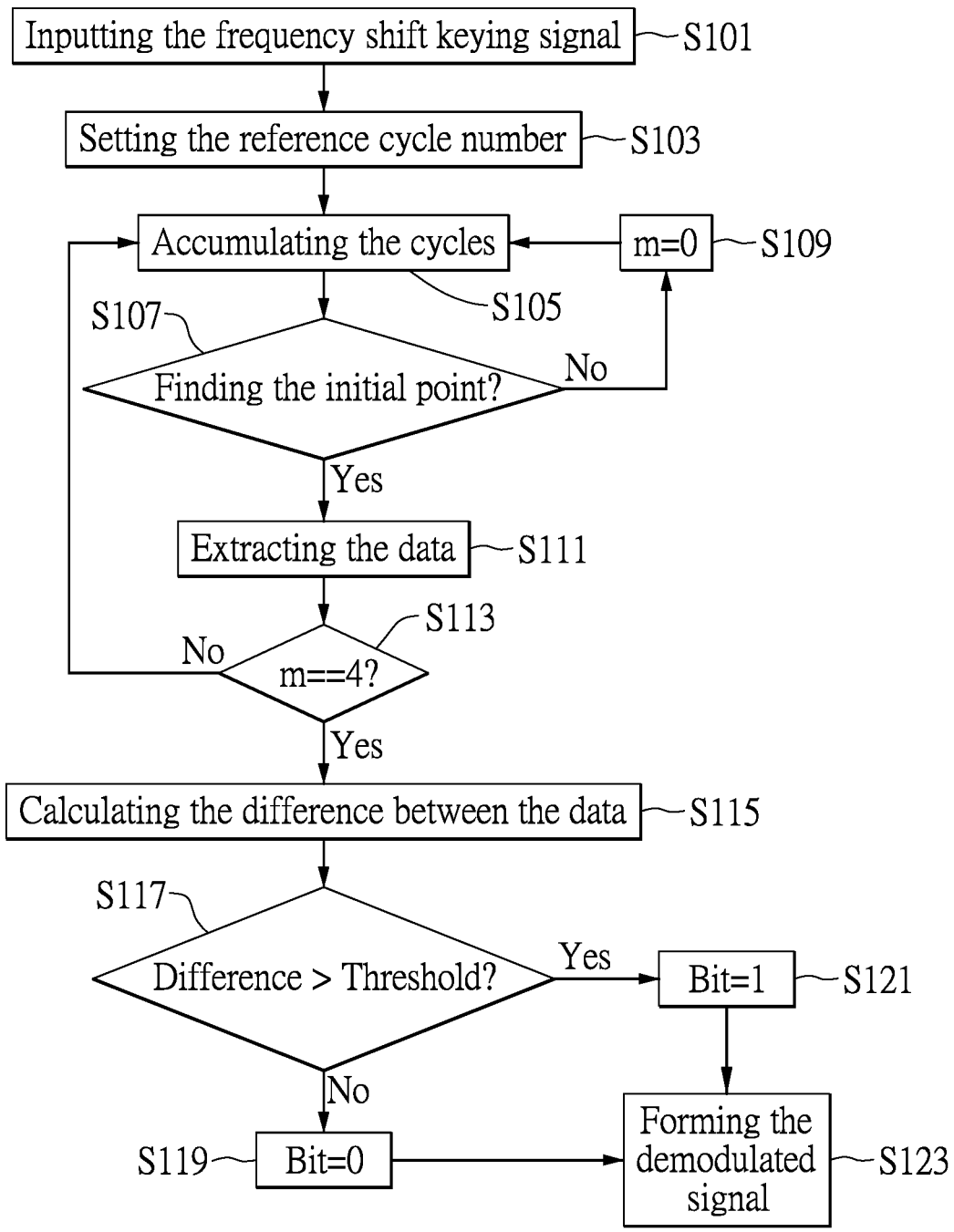
FIG. 1 is a flowchart diagram of a data determination algorithm of a method of demodulating a frequency shift keying signal according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
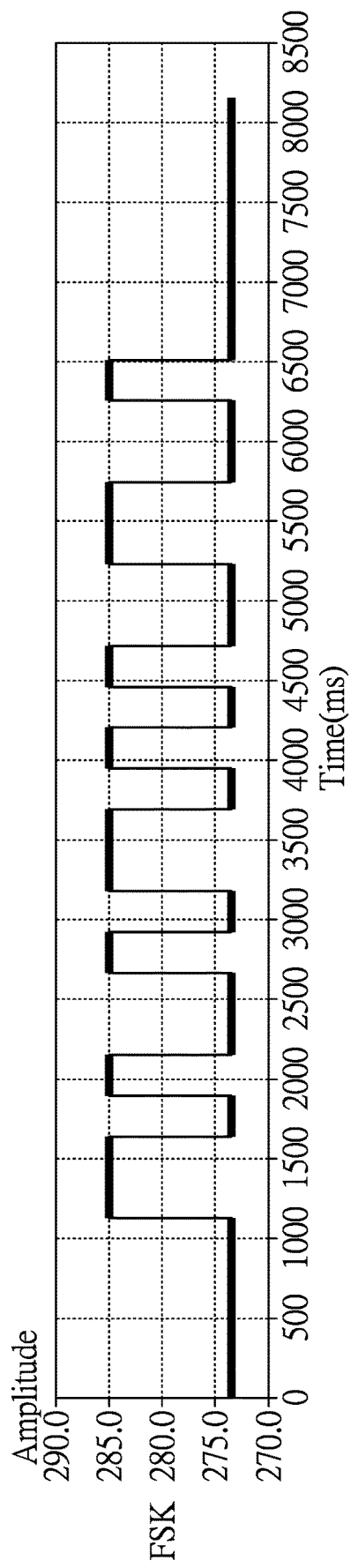
FIG. 2 is a waveform diagram of the frequency shift keying signal of a system of demodulating the frequency shift keying signal according to the embodiment of the present disclosure.

Reference is made to FIGS. 1 and 2, wherein FIG. 1 is a flowchart diagram of a data determination algorithm of a method of demodulating a frequency shift keying signal according to an embodiment of the present disclosure, and FIG. 2 is a waveform diagram of the frequency shift keying signal of a system of demodulating the frequency shift keying signal according to the embodiment of the present disclosure. As shown in FIG. 1, in the embodiment, the method of demodulating the frequency shift keying signal includes the following steps.

In step S101, the frequency shift keying (FSK) signal is inputted.

In step S103, the number of complete cycles of the frequency shift keying signal that is required for one bit (such as 512) is divided by a preset value (such as 4) to obtain a reference cycle number (such as 128). In other words, the number of the complete cycles of the frequency shift keying signal that is required for one bit (such as 512) is multiplied by a reciprocal of the preset value (such as 4) to obtain the reference cycle number (such as 128). A ratio of the reference cycle number to the number of the complete cycles of the frequency shift keying signal that is required for one bit is 1:4. It should be understood that the above-mentioned values are only exemplary, and the present disclosure is not limited to thereto.

In step S105, cycles of the frequency shift keying signal is accumulated to the reference cycle number from a time point, for example, from 0 ms shown in FIG. 2.

In step S107, it is determined whether or not an initial point of each of a plurality of pulse waves of the frequency shift keying signal is found. First, it is determined whether or not a rising time point of a rising edge of a first pulse wave among the pulse waves of a frequency shift keying signal FSK as shown in FIG. 2 is found. If the initial point such as the rising time point is not found, previous step S105 is performed again. If the initial point such as the rising time point is found, next step S109 is performed.

In step S109, the number of times of extracting data is zero, which is represented by m=0.

In step S111, the cycles of the frequency shift keying signal are accumulated to the reference cycle number multiple times from the initial point of each pulse wave of the frequency shift keying signal. The data (such as a frequency) of each pulse wave is extracted during a time interval from a starting point to an ending point of each accumulation.

In step S113, it is determined whether or not the number of times of extracting the data reaches the preset value such as 4. If the number of times of extracting the data does not reach the preset value, step S111 is performed again. If the number of times of extracting the data reaches the preset value, step S115 is performed.

In step S115, a difference between the data extracted multiple times is calculated.

In step S117, it is determined whether or not the difference between the data extracted multiple times is larger than a threshold. If the difference is not larger than the threshold, step S119 is performed. If the difference is larger than the threshold, step S121 is performed.

In step S119, a first bit value is outputted. For example, the first bit value is 0, which is represented by Bit=0.

In step S121, a second bit value is outputted. The second bit value is not equal to the first bit value. For example, the second bit value is 1, which is represented by Bit=1.

In step S123, the first bit value and the second bit value are packed into a demodulated signal.

Figure 3:
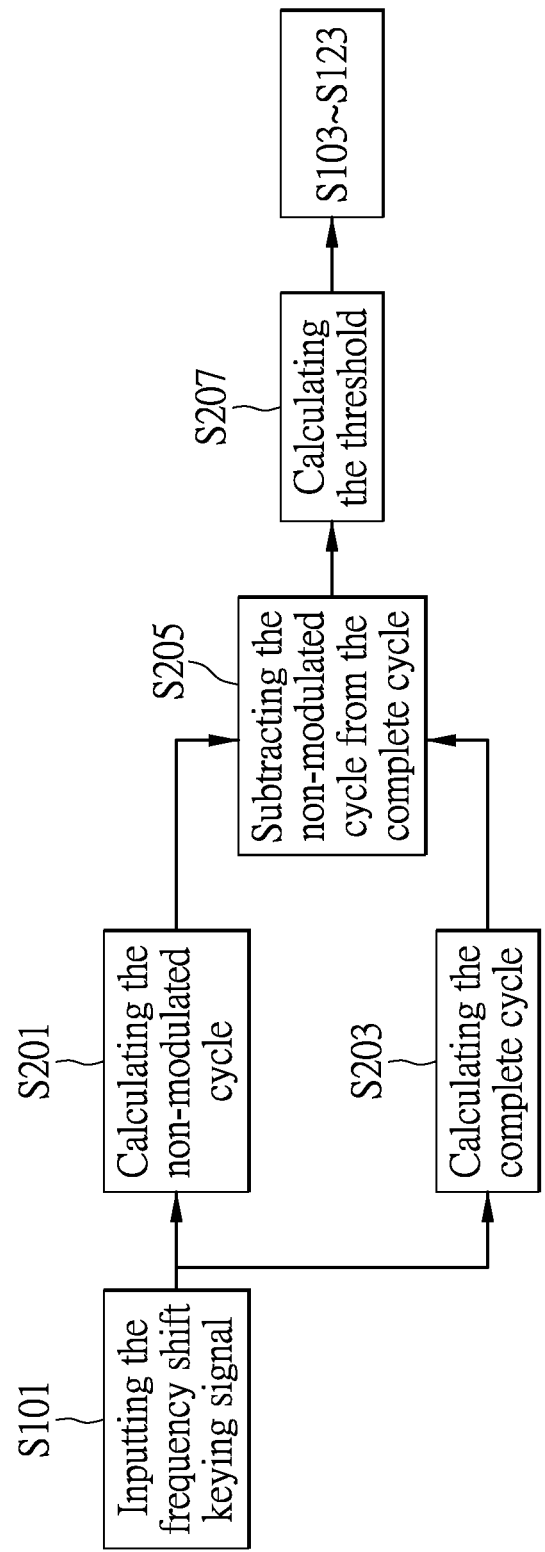
FIG. 3 is a flowchart diagram of subtracting a non-modulated cycle from a complete cycle before performing the data determination algorithm of the method of demodulating the frequency shift keying signal according to the embodiment of the present disclosure.
Figure 4:
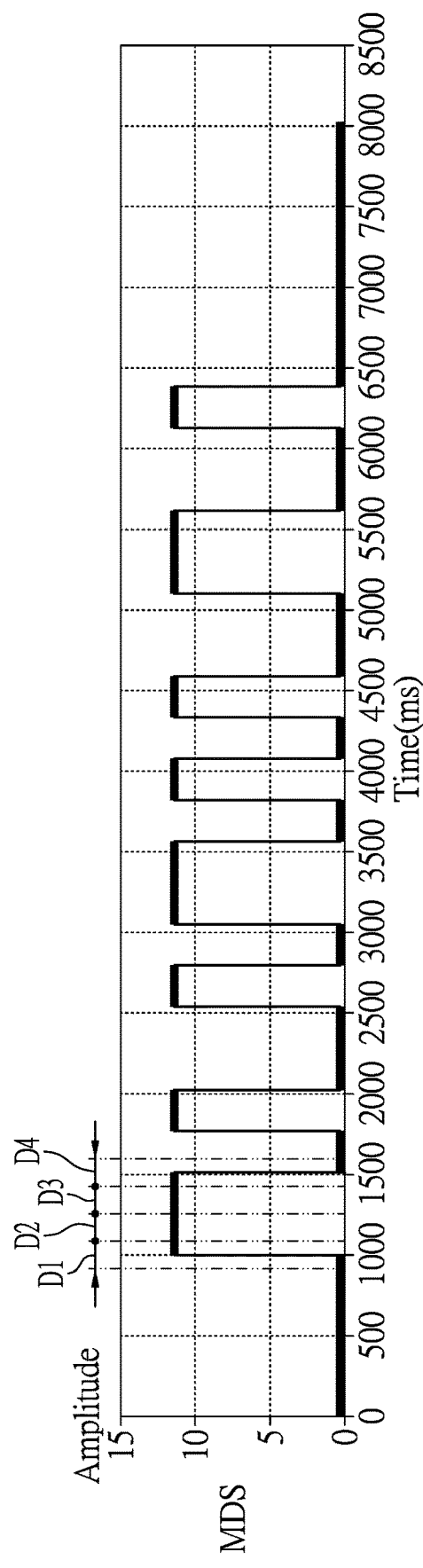
FIG. 4 is a waveform diagram of a modulated signal of the method of demodulating the frequency shift keying signal according to the embodiment of the present disclosure.
Figure 5:
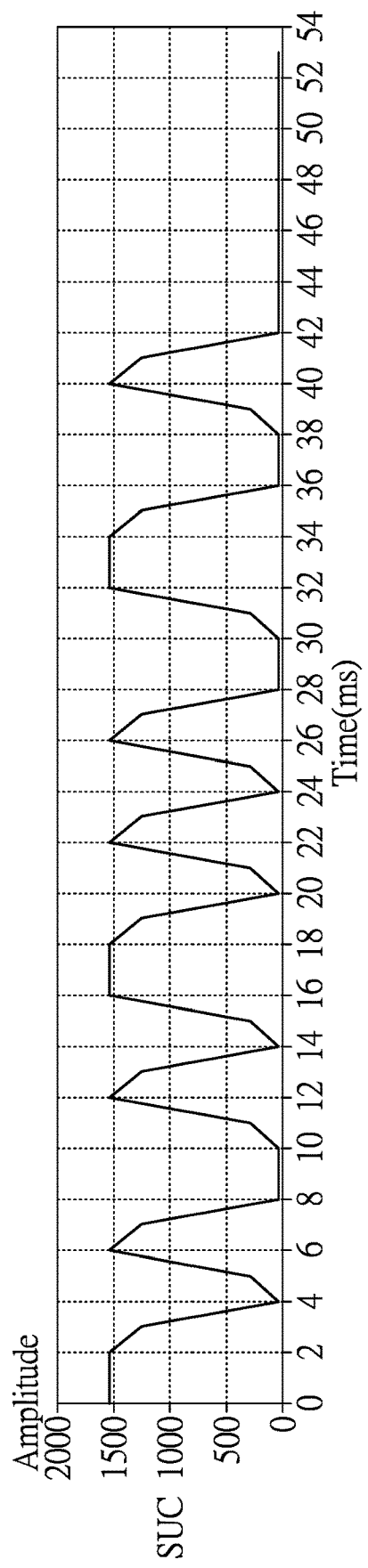
FIG. 5 is a waveform diagram of a pulse accumulated signal of the method of demodulating the frequency shift keying signal according to the embodiment of the present disclosure.

Reference is made to FIGS. 1 to 5, wherein FIG. 3 is a flowchart diagram of subtracting a non-modulated cycle from a complete cycle before performing the data determination algorithm of the method of demodulating the frequency shift keying signal according to the embodiment of the present disclosure, FIG. 4 is a waveform diagram of a modulated signal of the method of demodulating the frequency shift keying signal according to the embodiment of the present disclosure, and FIG. 5 is a waveform diagram of a pulse accumulated signal of the method of demodulating the frequency shift keying signal according to the embodiment of the present disclosure.

When original coils of a power transmitter and a power receiver are replaced with new coils, parameters of the new coils need to be detected by using additional equipment and machines, and the threshold for a decoding operation of the frequency shift keying signal is reset based on the parameters of the new coils. Therefore, a mass production efficiency of a system is reduced. In order to solve this problem, as shown in FIG. 3, in the embodiment, the method of demodulating the frequency shift keying signal further includes steps S201 to S207, which may be appropriately combined with the steps S101 to S123, as specifically described below.

In step S201, the non-modulated cycle of the frequency shift keying signal in a default time is calculated.

In step S203, the number of the complete cycles of carrier waves of the frequency shift keying signal (such as the frequency shift keying signal FSK shown in FIG. 2) that is not modulated and required for one bit is calculated.

In step S205, the non-modulated cycle is subtracted from the complete cycle of the carrier waves of the frequency shift keying signal to obtain a non-demodulated signal such as a non-demodulated signal MDS shown in FIG. 4.

In step S207, after the non-modulated cycle is subtracted from the complete cycles of the carrier waves of the frequency shift keying signal, the threshold is calculated based on waveform parameters of the non-demodulated signal. The threshold is a constant value that does not change with a frequency of the frequency shift keying signal. For example, the threshold is an average value of a peak value and a valley value of the non-demodulated signal such as the non-demodulated signal MDS shown in FIG. 4.

Then, step S103 is performed. In step S103, the number of the complete cycles of non-demodulated signal that is required for one bit is divided by the preset value to obtain the reference cycle number. Finally, the data determination algorithm of steps S105 to S123 is performed. In step S111, if the preset value is 4, first pulse data D1, second pulse data D2, third pulse data D3 and fourth pulse data D4 are sequentially extracted from the non-demodulated signal MDS as shown in FIG. 4. For example, if it is determined that the difference between the second pulse data D2 and the third pulse data D3 is larger than the threshold such as $\frac{1}{16}$ in step S117, step S121 is then performed. After steps S105 to S123 are performed on the pulse waves of the frequency shift keying signal, a pulse accumulated signal SUC shown in FIG. 5 is generated. For example, the cycles of the frequency shift keying signal is accumulated to 128 (that is, the reference cycle number) for 12 times to obtain 1536.

Figure 6:
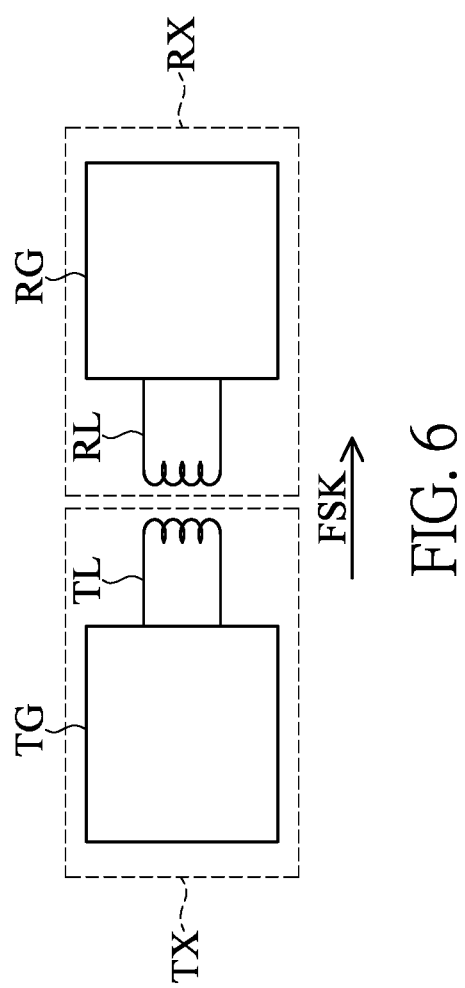
FIG. 6 is a circuit layout diagram of a power transmitter and a power receiver of the system of demodulating the frequency shift keying signal according to the embodiment of the present disclosure.
Figure 7:
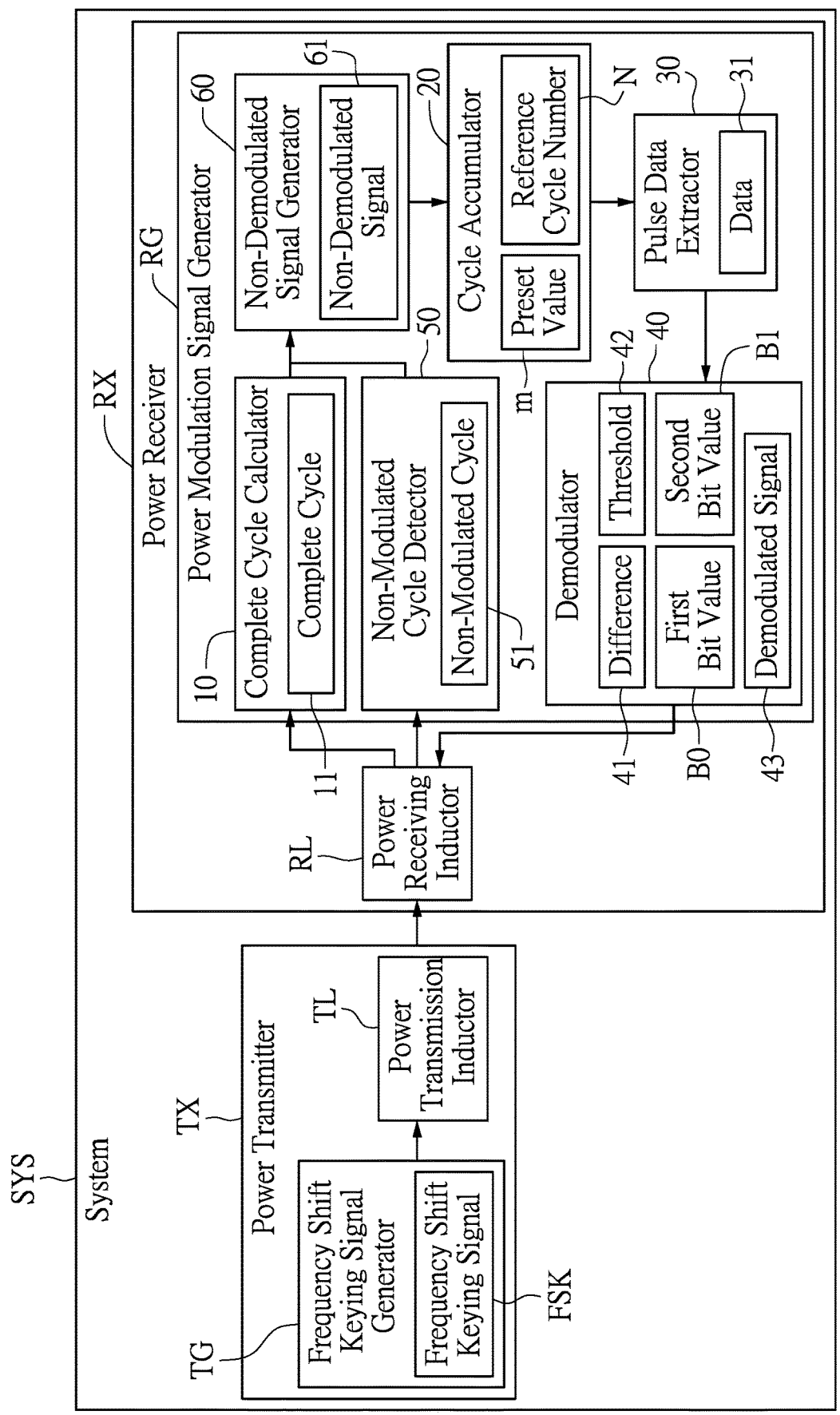
FIG. 7 is a function block diagram of the system of demodulating the frequency shift keying signal according to the embodiment of the present disclosure.

Reference is made to FIGS. 6 and 7, wherein FIG. 6 is a circuit layout diagram of a power transmitter and a power receiver of the system of demodulating the frequency shift keying signal according to the embodiment of the present disclosure, and FIG. 7 is a function block diagram of the system of demodulating the frequency shift keying signal according to the embodiment of the present disclosure.

As shown in FIGS. 6 and 7, a system SYS of demodulating the frequency shift keying signal may include a power transmitter TX and a power receiver RX. The power transmitter TX includes a frequency shift keying signal generator TG and a power transmission inductor TL. The frequency shift keying signal generator TG is connected to the power transmission inductor TL. The power transmission inductor TL may be a component that has an inductive property and is formed by winding a wire into a coil shape.

The power receiver RX includes a power modulated signal generator RG and a power receiving inductor RL. The power receiving inductor RL is connected to the power modulated signal generator RG. Similarly, the power receiving inductor RL may be a component that has an inductive property and is formed by winding a wire into a coil shape. The power transmission inductor TL of the power transmitter TX is electromagnetically coupled with the power receiving inductor RL of the power receiver RX.

An electromagnetic induction may be generated between the power transmission inductor TL of the power transmitter TX and the power receiving inductor RL of the power receiver RX. A power signal may be transmitted bidirectionally between a power signal generator TG and the power modulated signal generator RG. The power signal generator TG may output the frequency shift keying signal FSK carrying power to the power modulated signal generator RG.

It is worth noting that, the power modulated signal generator RG may include a complete cycle calculator 10, a cycle accumulator 20, a pulse data extractor 30, a demodulator 40, a non-modulated cycle detector 50, and a non-demodulated signal generator 60.

The power receiving inductor RL obtains the frequency shift keying signal FSK generated by the frequency shift keying signal generator TG from the power transmission inductor TL. The complete cycle calculator 10 is connected to the power receiving inductor RL. The complete cycle calculator 10 is configured to receive the frequency shift keying signal FSK from the power receiving inductor RL, and calculate a complete cycle 11 of the carrier waves of the frequency shift keying signal FSK that is not modulated. The non-modulated cycle detector 50 is connected to the power receiving inductor RL. The non-modulated cycle detector 50 is configured to receive the frequency shift keying signal FSK from the power receiving inductor RL, and detect a non-modulated cycle 51 of the frequency shift keying signal FSK.

In practice, the frequency shift keying signal FSK sent by the power transmitter TX may include the power signal and a power modulation instruction message. Under this condition, a power signal modulator (not shown in the figures) of the power transmitter TX modulates parameters of the power signal so as to adjust the power of the power signal, according to power adjustment parameters indicated by the power modulation instruction message. The complete cycle calculator 10 calculates the complete cycle 11 of the frequency shift keying signal FSK that is modulated.

The non-demodulated signal generator 60 is connected to the complete cycle calculator 10 and the non-modulated cycle detector 50. The non-demodulated signal generator 60 is configured to subtract the non-modulated cycle 51 from the complete cycle 11 of the carrier waves of the frequency shift keying signal FSK to obtain a non-demodulated signal 61. The cycle accumulator 20 is connected to the non-demodulated signal generator 60. The cycle accumulator 20 divides the number of the complete cycles of the non-demodulated signal 61 that is required for one bit by a preset value m to obtain a reference cycle number N. Further, the cycle accumulator 20 accumulates the cycles of the non-demodulated signal 61 to the reference cycle number N from a time point.

The pulse data extractor 30 is connected to the cycle accumulator 20. The pulse data extractor 30 is configured to extract data 31 of each pulse wave of the non-demodulated signal 61, each time the cycle accumulator 20 accumulates the cycles of the non-demodulated signal 61 to the reference cycle number. When the number of times of extracting the data 31 reaches the preset value m, the cycle accumulator 20 stops extracting the data 31.

The demodulator 40 is connected to the pulse data extractor 30 and configured to calculate a difference 41 between the data extracted. When the demodulator 40 determines that the difference 41 is smaller than a threshold 42, the demodulator 40 outputs a first bit value B0. Conversely, when the demodulator 40 determines that the difference 41 is larger than the threshold 42, the demodulator 40 outputs a second bit value B1 that is not equal to the first bit value B0. The demodulator 40 packages the first bit value B0 and second bit value B1 into a demodulated signal 43.

Further, if necessary, the frequency shift keying signal generator TG may further include an amplitude shift keying signal generator (not shown in the figures). The amplitude shift keying signal generator is configured to output an amplitude shift keying (ASK) signal to the power transmitter TX according to (an amplitude of) the demodulated signal 43.

In summary, the present disclosure discloses the system and method of demodulating the frequency shift keying signal. The threshold is calculated based on the parameters of the pulse waves of the frequency shift keying signal, the cycle of which does not include the non-modulated cycle. The threshold is a constant value, which does not change with the frequency of the frequency shift keying signal. It is worth noting that, the data of the frequency shift keying signal is not processed until the number of the cycles of the frequency shift keying signal reaches N (such as 128). Therefore, the demodulation of the frequency shift keying signal can be completed in simple steps such that computational complexity of the system can be greatly reduced. As a result, the frequency shift keying signal can be demodulated by using low-order circuit components of the system under the condition that the system operates in a low frequency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method of demodulating a frequency shift keying signal, comprising the following steps:
    (a) inputting the frequency shift keying signal;
    (b) calculating a complete cycle of each of carrier waves of the frequency shift keying signal that is not modulated;
    (c) subtracting a non-modulated cycle from the complete cycle of each of the carrier waves of the frequency shift keying signal to obtain a non-demodulated signal;
    (d) generating a threshold according to waveform parameters of the non-demodulated signal;
    (e) dividing the number of complete cycles of the frequency shift keying signal that is required for one bit by a preset value to obtain a reference cycle number;
    (f) accumulating cycles of the frequency shift keying signal to the reference cycle number from a time point;
    (g) determining whether or not an initial point of each of pulse waves of the frequency shift keying signal is found, in response to determining that the initial point is not found, returning to previous step (f), in response to determining that the initial point is found, performing next step (h);
    (h) accumulating the cycles of the frequency shift keying signal to the reference cycle number multiple times from the initial point of each of the pulse waves of the frequency shift keying signal, and extracting data of the pulse wave from a starting point to an ending point of each accumulation;
    (i) determining whether or not the number of times of extracting the data reaches the preset value, in response to determining that the number of times of extracting the data fails to reach the preset value, returning to previous step (h) in response to determining that the number of times of extracting the data reaches the preset value, performing next step (j);
    (j) subtracting the data that is extracted previously from the data that is extracted next time to calculate a difference;
    (k) determining whether or not the difference is larger than the threshold, in response to determining that the difference is not larger than the threshold, outputting a first bit value, in response to determining that the difference is larger than the threshold, outputting a second bit value, wherein the second bit value is not equal to the first bit value; and (l) packing the first bit value and the second bit value into a demodulated signal.

2. The method according to claim 1, further comprising the following step:

setting the preset value to 4.

3. A system of demodulating a frequency shift keying signal, comprising:

a complete cycle calculator configured to receive the frequency shift keying signal and calculate the number of complete cycles of the frequency shift keying signal that is required for one bit;

a cycle accumulator connected to the complete cycle calculator, and configured to accumulate cycles of the frequency shift keying signal to a reference cycle number multiple times from a time point;

a pulse data extractor connected to the cycle accumulator, and configured to extract data of each of pulse waves from a starting point to an ending point of each accumulation performed by the cycle accumulator until the number of times of extracting the data reaches a preset value;

a demodulator connected to the pulse data extractor, and configured to subtract the data that is extracted previously from the data that is extracted next time to calculate a difference, output a first bit value when the difference is smaller than a threshold, output a second bit value that is not equal to the first bit value when the difference is larger than the threshold, and package the first bit value and the second bit value into a demodulated signal;

a non-modulated cycle detector configured to receive the frequency shift keying signal and detect a non-modulated cycle of the frequency shift keying signal; and a non-demodulated signal generator connected to the complete cycle calculator and the non-modulated cycle detector, and configured to subtract the non-modulated cycle from the complete cycle of each of carrier waves of the frequency shift keying signal that is not modulated to obtain a non-demodulated signal;

wherein the number of the complete cycle from which the non-modulated cycle has been subtracted is divided by the preset value to obtain the reference cycle number by the cycle accumulator, and the demodulator is configured to generate the threshold according to waveform parameters of the non-demodulated signal.

4. The system according to claim 3, wherein the preset value is 4.

* * * * *